United States Patent
Nagata et al.

[11] Patent Number: 5,878,629
[45] Date of Patent: Mar. 9, 1999

[54] STEERING WHEEL ASSEMBLY

[75] Inventors: Atsushi Nagata, Inazawa; Akio Hosoi, Komaki; Tooru Koyama, Nishikasugai-gun, all of Japan

[73] Assignee: Toyoda Gosei Co., Ltd., Aichi-ken, Japan

[21] Appl. No.: 773,172

[22] Filed: Dec. 24, 1996

[51] Int. Cl.[6] .................................................. B62D 1/04
[52] U.S. Cl. ............................................ 74/552; 403/259
[58] Field of Search ............................. 74/552; 403/259, 403/261, 359, 370, 365

[56] References Cited

U.S. PATENT DOCUMENTS

| | | | |
|---|---|---|---|
| 4,541,299 | 9/1985 | Kanaya et al. | 74/493 |
| 4,561,324 | 12/1985 | Hiramitsu et al. | 74/498 |
| 4,574,653 | 3/1986 | Hiramitsu et al. | 74/484 R |
| 4,630,501 | 12/1986 | Kubota et al. | 74/484 R |
| 4,667,529 | 5/1987 | Ono et al. | 74/492 |
| 4,685,848 | 8/1987 | Langer | 411/402 |
| 4,893,520 | 1/1990 | Endo et al. | 74/552 |
| 4,899,611 | 2/1990 | Pinna | 74/492 |
| 5,144,861 | 9/1992 | Nishijima et al. | 74/552 |
| 5,536,106 | 7/1996 | Landis et al. | 403/374 |
| 5,584,501 | 12/1996 | Walters | 280/728.2 |
| 5,588,337 | 12/1996 | Milton | 74/552 |
| 5,617,763 | 4/1997 | Cymbal | 74/552 |

FOREIGN PATENT DOCUMENTS

| | | | |
|---|---|---|---|
| 0 475 183 | 3/1992 | European Pat. Off. | 74/552 |
| 2614951 | 11/1988 | France | 403/259 |
| 63-134368 | 6/1988 | Japan | 74/552 |
| 2-24691 | 7/1990 | Japan | 74/552 |
| 2-133955 | 11/1990 | Japan | 74/552 |
| 4-95569 | 3/1992 | Japan | 74/552 |
| 5-2388 | 1/1993 | Japan | 74/552 |
| 350693 | 6/1931 | United Kingdom . | |
| 655837 | 8/1951 | United Kingdom | 74/552 |
| 2 058 694 | 4/1981 | United Kingdom | 74/552 |
| 2102092 | 1/1983 | United Kingdom | 403/259 |
| 2 282 574 | 4/1995 | United Kingdom . | |

*Primary Examiner*—Vinh T. Luong
*Attorney, Agent, or Firm*—Intellectual Property Group of Pillsbury Madison & Sutro LLP

[57] ABSTRACT

An attaching system for a steering wheel assembly including a ring portion, a plurality of spokes, as well as integrally formed ring and spoke covering layers, and a pad portion. A steering shaft is formed at its distal end with external screw threads, a portion of which project beyond the upper surface of a boss plate. A nut includes a wheel gear having a plurality of teeth that are engagable with screw threads as a fastening tool. The nut is screwed onto or off from the steering shaft by the fastening tool that engages and rotates the nut, relative to steering shaft.

8 Claims, 7 Drawing Sheets

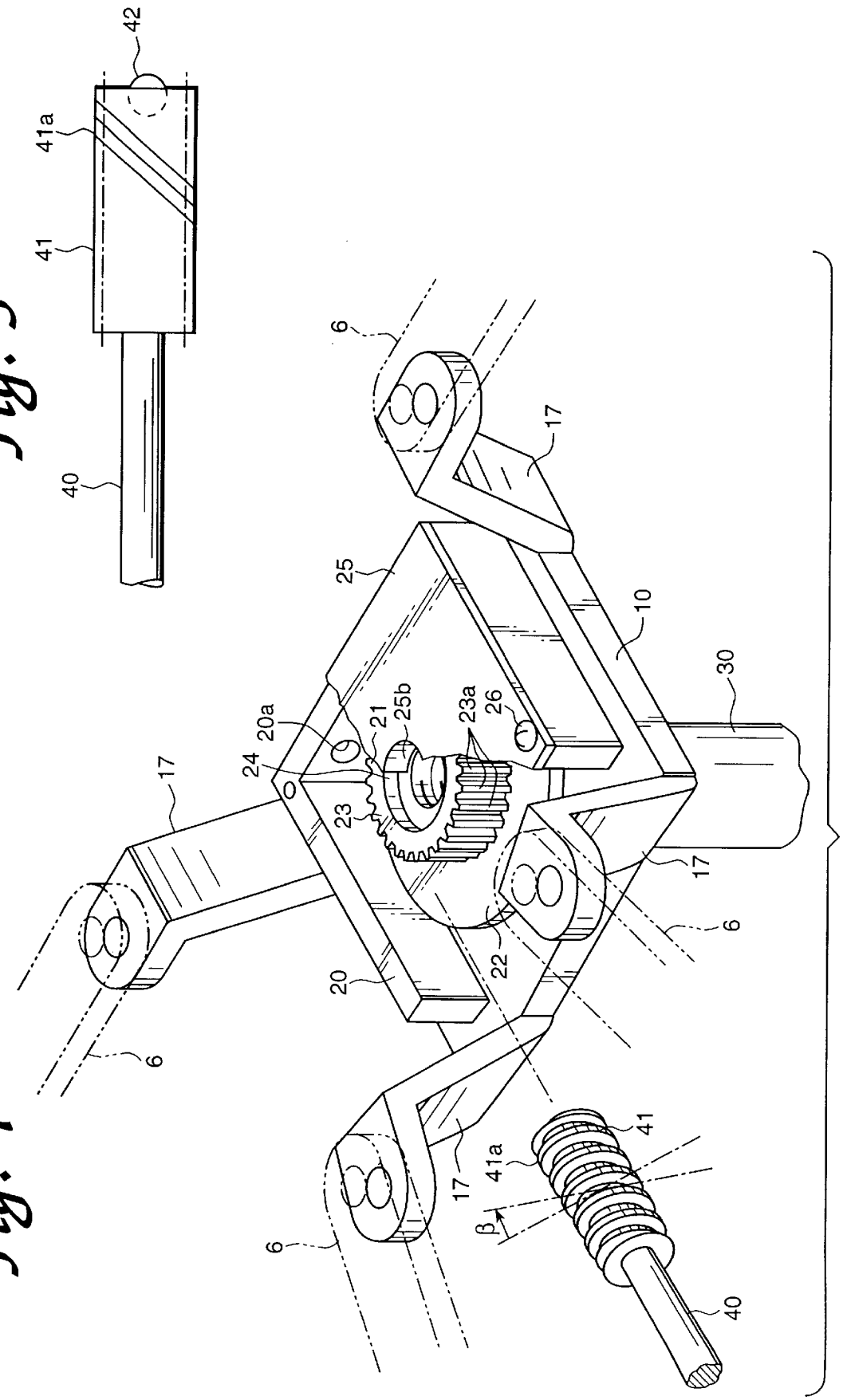

STEERING WHEEL ASSEMBLY

BACKGROUND OF THE INVENTION

1. Field of the Invention

The present invention relates to a steering wheel assembly and in particular to a structure for mounting a steering wheel assembly on a steering shaft.

2. Description of Related Art

A steering wheel assembly comprises a wheel or annular gripping ring portion, a pad portion disposed in the center of the ring portion, and a plurality of angularly spaced apart spokes for connecting the ring portion with the pad portion. A separated or independent pad is mounted at the pad portion.

A ring core is embedded in the ring portion and, similarly, spoke cores are embedded in the respective spokes. In this case, the ring and spoke cores are each covered with a covering layer made, for example, of foamed polyurethane, such as TPE. Further, a boss plate with a boss for mounting the entire steering wheel assembly on a steering shaft is coupled to the spoke cores beneath the pad adjacent the pad portion.

On the other hand, a steering wheel assembly has been proposed which has no interface line between the covering layers of the spokes and the pad portion when the covering layers and the pad portion are integrally formed in order to improve the appearance of the finished product (e.g., Japanese Unexamined Utility Model Publication No. Hei. 2-133955).

Although such type of steering wheels in which the ring and spoke core covering layers are integral with the pad portion have been widely used owing to its improved appearance, they have a problem, which will be described below, when mounting the steering wheel assembly on the steering shaft. Since the pad can not itself be removed from the covering layer for the ring core and spoke cores in the above-mentioned type of steering wheel assembly, it is hard to conduct screw-fastening of the boss plate to the steering shaft, especially when the boss plate is connected by a nut. Accordingly, a novel steering wheel assembly has been demanded which can be easily and positively mounted on the steering shaft even when the boss plate is connected with the spoke cores, that is, after the steering wheel has been assembled.

It is, therefore, an object of the present invention to provide a novel steering wheel assembly, including a cover layer covering a ring core and spoke cores which is formed integrally with a pad portion, that can be easily and positively mounted on a steering shaft.

SUMMARY OF THE INVENTION

In order to accomplish the above-mentioned objective, there is provided a steering wheel assembly having an annular gripping ring portion, a pad portion in the center of the ring portion, a plurality of angularly spaced apart spokes which connect the ring portion with the pad portion. A boss plate is secured to the lower side of the pad portion, which, in turn, is mounted on the steering shaft by screwing a nut on the shaft so that the steering wheel assembly can be rotated integrally with the steering shaft. The fastening system, however, includes a first gear on the nut, and a second gear provided at the distal end of a fastening tool, which will mesh with the first gear for rotating the nut.

The first and second gears may preferably be either spur gears, bevel gears or other forms of interengaging gear mechanisms.

The boss plate may be provided on its upper surface with a provisional fixing mechanism which fixes or assists in locating the nut and to prevent the nut from being removed from the boss plate.

The terms "upper and lower directions", as used herein refer to axial directions along the steering shaft, and not to the vertical direction when the steering wheel assembly is mounted on the steering shaft.

In accordance with the present invention, the nut is fastened or removed by means of a fastening tool which meshes with the nut. Since the nut is rotated by the engagement between gearing providing as part of the nut and the teeth of the fastening tool, fastening of the nut is made possible in the steering wheel assembly from which the pad can not be removed due to the fact that the fastening tool can be inserted from lateral or lower position, or from a direction other than from an upper direction. That is, the steering wheel assembly in which covering layer which covers the ring core and spoke cores can be easily and positively mounted on the steering shaft.

Furthermore, removal of only the nut can be prevented by provisional fixing structure. The nut is removed together with the boss plate from the steering shaft. Accordingly, removing of the boss plate is simplified.

Other objects, features, and characteristics of the invention will become apparent upon consideration of the following description and the appended claims with reference to the accompany drawings, all of which form a part of this specification and wherein like reference numerals represent corresponding parts in the various views.

BRIEF DESCRIPTION OF THE DRAWINGS

FIG. 4 is a perspective view showing the structure of the boss plate and its peripheral parts and the structure of the fastening tool parts of which have been cut away for clarity;

FIG. 5 is a front view showing the fastening tool;

FIGS. 6(a) and 6(b) are cross-sectional views taken along lines VIa—VIa and VIb—VIb, respectively, showing the engagement between the nut and the fastening tool on mounting, with FIG. 6(a) showing a tight fit situation of the nut, while FIG. 6(b) shows a loose fitting situation of the nut;

DETAILED DESCRIPTION OF THE PREFERRED EMBODIMENTS

Figure 1:
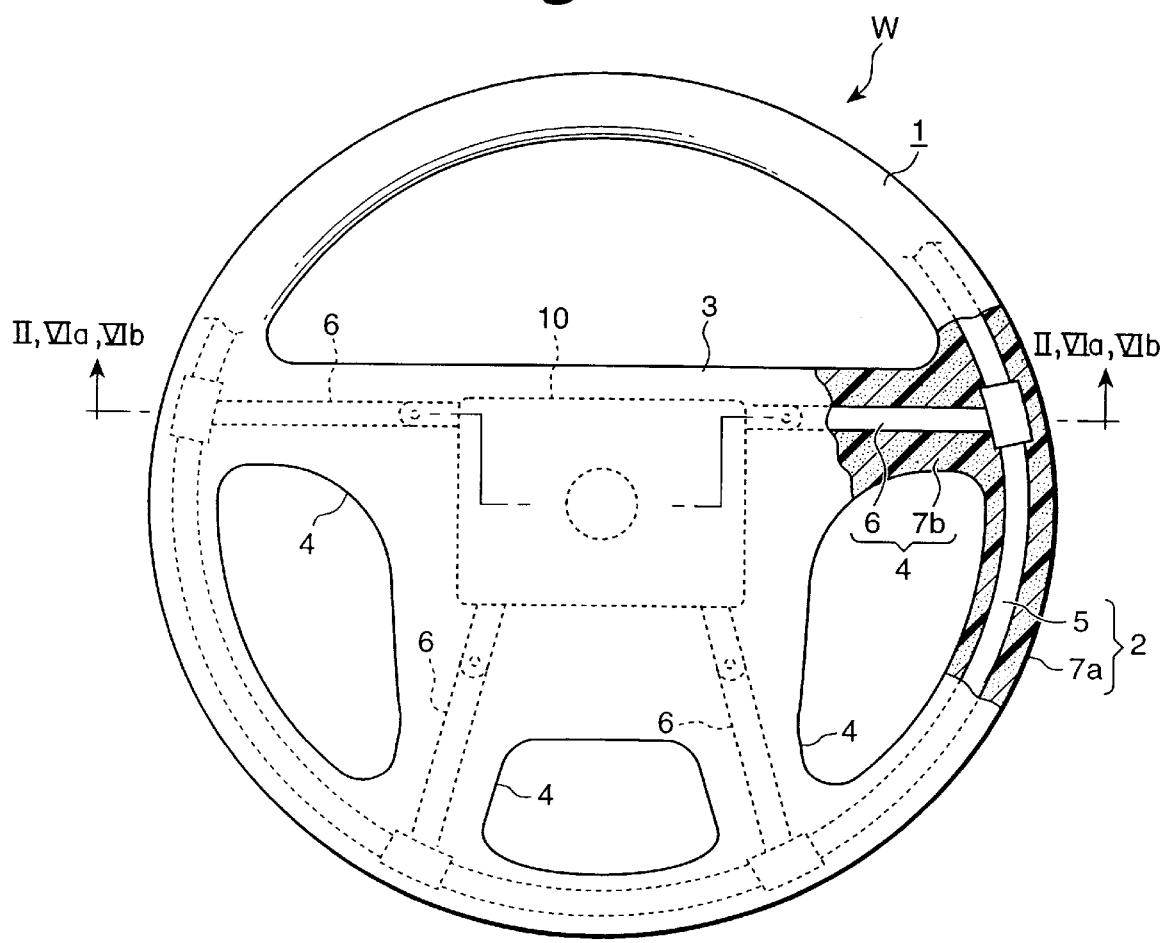
FIG. 1 is a plan view showing a steering wheel assembly of a first embodiment of the present invention.

A first embodiment of the present invention will be described with reference to FIGS. 1 and 2. A main body 1 of the steering wheel assembly W comprises an annular gripping ring portion 2, a pad portion 3, disposed in the center of the ring portion 2, and four angularly spaced spokes 4 which interconnect the ring portion 2 with the pad portion 3.

The ring portion 2 comprises a core member 5, which is formed of, for example, a steel pipe ring or an aluminum alloy ring, and a covering layer 7a covers the core member 5. Each of the spokes 4 comprises a core member 6 made, for example, of a light weight diecast metal, such as aluminum alloy, and a covering layer 7b which covers the core member 6.

The covering layers 7a, 7b and a covering layer of the pad portion 3 are made of soft synthetic resin, for example, foamed polyurethane, TPE (Thermoplastic Elastomer) and are integrally formed with each other.

Figure 2:
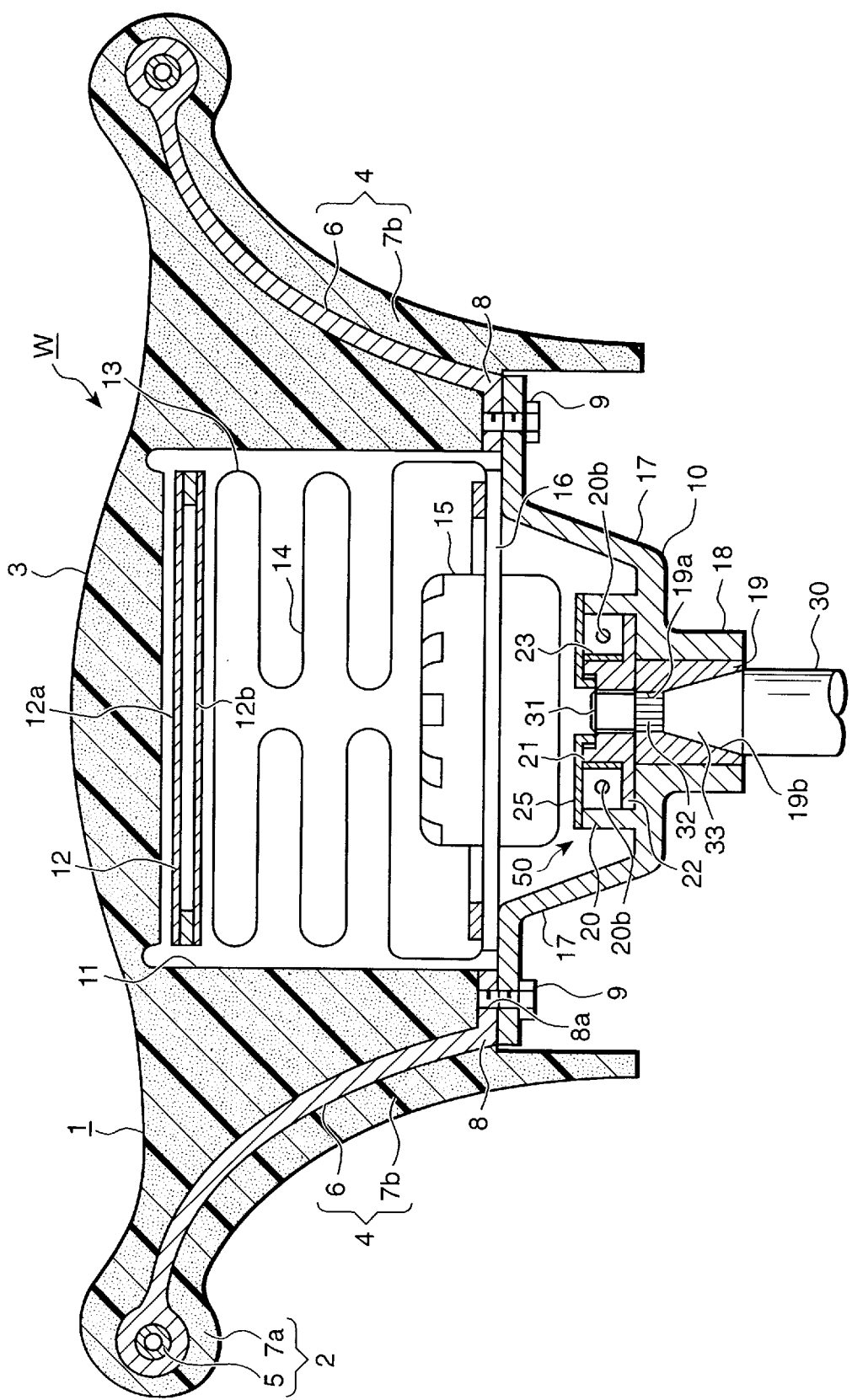
FIG. 2 is a sectional view taken along the line II—II in FIG. 1.

As shown in FIG. 2, each of the spoke core members 6 extend obliquely and downwardly from the core member 5 of the ring portion 2 and each is formed at the lower end thereof with a flat portion 8 that is provided with an internal screw hole 8a. A boss plate 10, for securing a steering shaft 30, is fastened to the flat portion 8 of the spoke core member 6 by means of a plurality of screws 9. The structure of the boss plate 10 will be described hereafter in detail.

The pad portion 3 is formed with a substantially square-tubular shaped accommodation recess 11 which is defined by the covering layer. A membrane switch 12 and an air bag device 13 are accommodated within the recess 11. The membrane switch 12 is comprised of upper and lower thin plates 12a and 12b, respectively, which constitute a part of a horn switch. The thin plates 12a and 12b are brought into contact by the pad portion 3 being depressed so that the horn will sound as a consequence of the pad being pushed and contact between plates 12a and 12b.

The air bag device 13 comprises an air bag 14 which is accommodated in a folded manner and an inflator 15 for supplying a gas to inflate the air bag 14. The inflator 15 has a flange 16 which is also secured to the boss plate 10.

Figure 3:
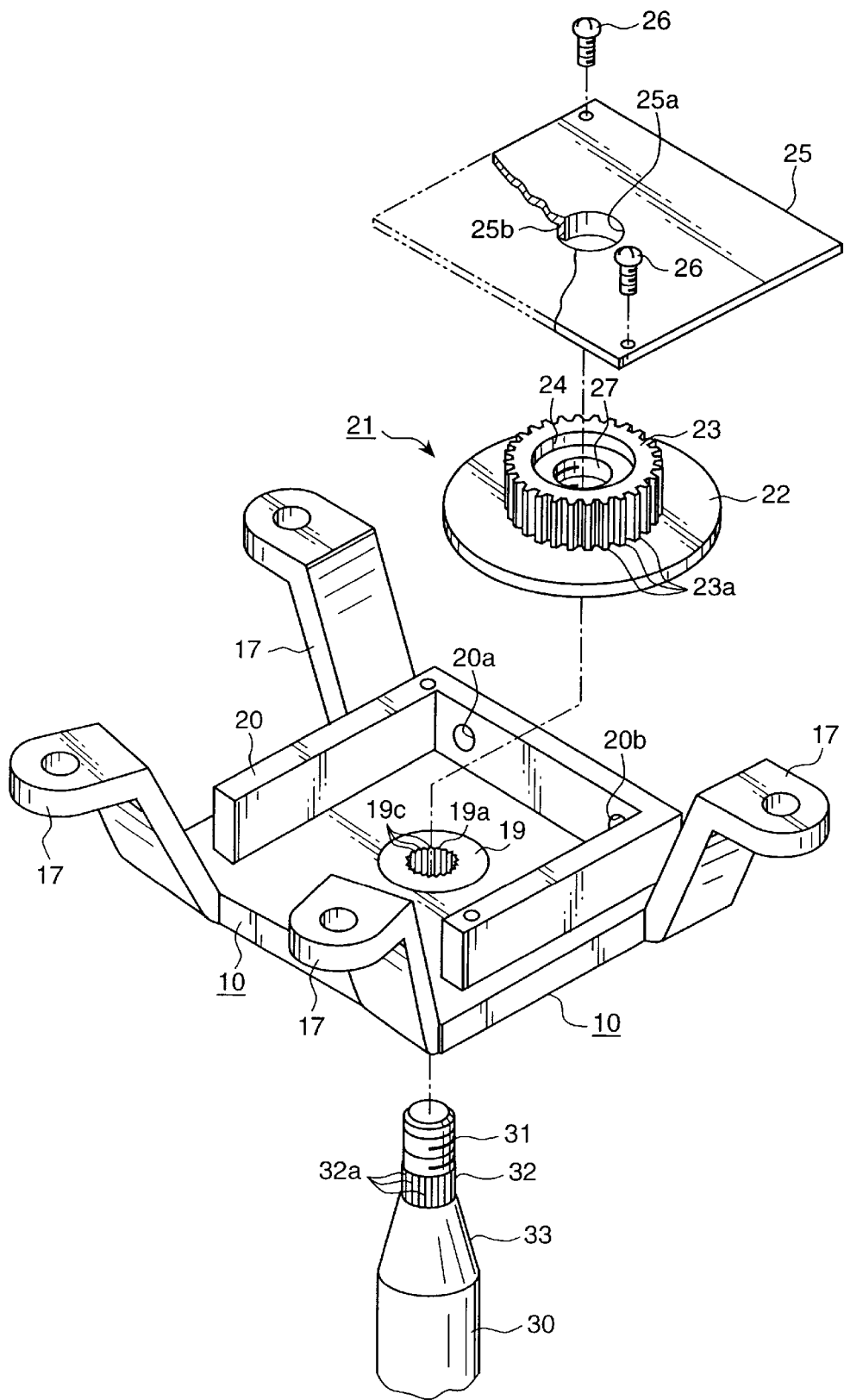
FIG. 3 is an exploded perspective view showing the structure of the boss plate and its peripheral parts.

Mounting of the steering wheel assembly W together with the boss plate 10 and its peripheral parts will be described with reference to FIGS. 2 and 3. The steering shaft 30 is formed with an external screw or threads 31 at the distal end thereof. A serration area 32, having a given number of teeth 32a, is formed below the external screw threads 31. A tapered surface 33 is located below the serration area 32.

Boss plate 10 is formed of light weight diecast metal, such as aluminum alloy, and is formed with brackets 17 at each of the four corners thereof or of spaced apart positions.

Each of the brackets 17 extends obliquely outwardly and upwardly from the boss plate 10 and the spoke core members 6 are fastened with the distal end of the brackets 17, respectively as in FIG. 2 by screws 9.

Figure 6A:
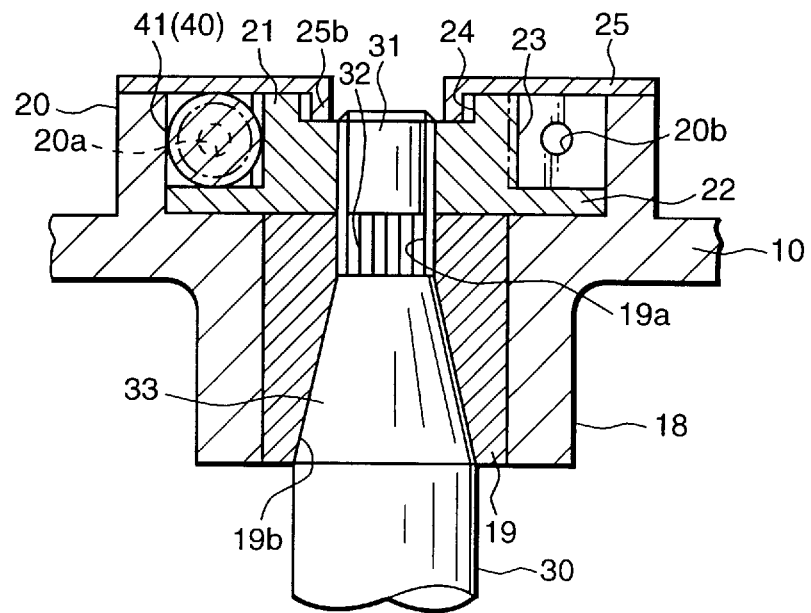
Figure 6B:
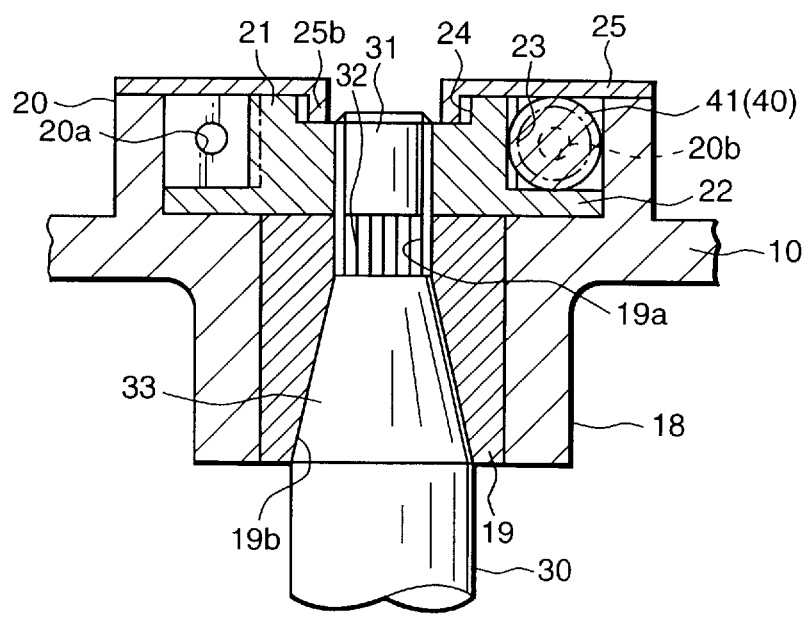

A cylindrical boss 18 projects downwardly from the bottom of boss plate 10, as best shown in FIGS. 2, 6(a) and 6(b). An insert member 19, made of steel, is formed integrally with the center of the boss 18 by diecasting. The insert member 19 is in the form of a cylinder having a central axis which is oriented in a vertical direction. The insert member 19 is formed on its inner peripheral surface with serration area 19a and a tapered surface 19b which are complimentary of the serration area 32 and the tapered surface 33 on the steering shaft 30, respectively. Accordingly, the serration area 19a has the same number of teeth 19c as that of teeth 32a of serration area 32.

By inserting the steering shaft 30 into the insert 19 of the boss 18, the serration area 19a of the insert 19 engages and meshes with the serration area 32 of the steering shaft 30. Likewise, the tapered surface 19b abuts the tapered surface 33. At this time, the external screw 31, which is provided at the distal end of the steering shaft 30, projects beyond the upper surface of boss plate 10. The boss plate 10 is formed on the upper surface thereof with a π-shaped or gate-like support 20 projecting upwardly therefrom, which surrounds the insert 19 on three sides as shown in FIG. 3. The support 20 comprises three segments. The middle segment of them is formed with holes 20a and 20b, or alternatively, recesses could be employed in lieu of holes 20a/20b, in the vicinity of or adjacent the opposite ends thereof.

A nut 21 is rotatably engaged with the external screw 31 of the steering shaft 30. The nut 21 is disposed in such a position that it is surrounded by the support 20. The nut 21 comprises a disc 22, which is placed on the boss plate 10, and a first gear or wheel gear 23 having a plurality of teeth 23a. Where gear 23 can be formed on the disc 22 or otherwise joined with disc 22. The nut 21 is provided at the upper end thereof with a circular notch 24 having an axis aligned with that of the nut 21 and includes a through hole 27 that is threaded to receive threads 31.

A fixing plate 25, for example, having a rectangular shape or a shape corresponding to support 20, is disposed on the support 20. The fixing plate 25 is secured to the support 20 by screws 26. The fixing plate 25 includes in the center thereof a through-hole 25a. A circular projection 25b, which will be adapted to extend into notch 24 of the nut 21, is formed on the plate 25 and surrounds the through-hole 25a. In the present embodiment, the support 20 and the fixing plate 25 constitute a provisional fixing mechanism 50.

The process for mounting the steering wheel assembly W onto the steering shaft 30 will now be described. It is assumed that the membrane switch 12 and the air bag device 13 have preliminarily been accommodated in the main body 1 of the steering wheel assembly W and that the boss plate 10 has been secured to the spoke core members 6 prior to this mounting process.

As shown in FIG. 4, the nut 21 has been positioned in such a manner that it is surrounded by the support 20 on the boss plate 10 and fixing plate 25 has been mounted on support 20 to overlie nut 21. The steering shaft 30 is then inserted into the insert 19 so that the serration area 32 of the steering shaft 30 is brought into engagement with the serration 19a of the insert 19.

The inner threads in bore 27 of nut 21 are rotatably engaged with the external screw 31 of the steering shaft 30 by using a fastening tool 40 having worm gear 41 on the outer periphery thereof and preferably at the distal end thereof. That is, the teeth 41a of the gear 41 on the second fastening tool 40 comprise a worm gear having a helix angle or thread angle β with respect to the direction normal to the axis of tool 40. The worm gear 41 and the wheel gear 23 of the nut 21 will mesh together with the gear teeth 23a so that gear 23 is engaged and driven by worm gear 41. As shown in FIG. 5, the fastening tool 40 is provided at the distal end with a ball 42 so that the ball 42 can not be removed therefrom and is rotatable in a desired direction.

In order to screw the nut 21 onto the steering shaft 30, the fastening tool 40 is initially inserted into the opening of the support 20 on the side of wheel gear 23 lying adjacent hole or recess 20a as shown in FIG. 4. The tool 40 is then rotated in a fastening direction. This initial rotation serves to mesh the worm gear 41 of the fastening tool 40 with the teeth 23a of the wheel gear 23 of the nut 21 as shown in FIG. 6(a). Continued rotation of tool 40 causes the worm gear 41 and thereby tool 40 to advance past nut 21 until the ball 42 at the distal end of tool 40 abuts hole 20a of the support 20. Once in this position, further rotation of fastening tool 40 rotates the nut 21 relative to shaft 30, in lieu of advancement of the gear 41. That is, the nut 21 is rotated around the axis of the steering shaft 30 so that the nut 21 is screwed on the external screw 31 of shaft 30.

After screw-fastening of the nut 21 is completed, the fastening tool 40 is rotated in a direction opposite to the fastening direction. This allows the fastening tool 40 to be retracted. The gear 41 of the fastening tool 40 is disengaged from the teeth 23a of the wheel gear 23 of the nut 21 and nut 21 remains fastened on shaft 30. Mounting of the steering wheel assembly W is thus completed by removing fastening tool 40.

On the other hand, in order to remove the steering wheel assembly W from the steering shaft 30, the fastening tool 40 is used again. The fastening tool 40 is now inserted into the opening on the opposite side of wheel gear 23 and on the opposite side of the opening through which it was inserted for mounting of the steering wheel assembly W. The removal position of tool 40 is shown in FIG. 6(b). The fastening tool 40 is rotated in the same direction as the fastening direction. Worm gear 41 of the fastening tool 40 again meshes with the teeth 23a of the wheel gear 23 of the nut 21. The worm gear 41 and fastening tool 40 advance until the ball 42, at the distal end of the tool 40, abuts hole 20b of the support 20. Thereafter, continued rotation of the fastening tool 40 rotates nut 21 relative to shaft 30 in lieu of advancement of the gear 41. At this time, the nut 21 is rotated in a direction opposite to the fastening direction so that the nut 21 is loosened and can be removed. Since the upper surface of the nut 21 is biased by the fixing plate 25, the boss plate 10 is removed from the steering shaft 30 simultaneously with the removal of the nut 21.

In the above mentioned first embodiment, a number of advantages are provided.

The nut 21 is provided on the outer peripheral surface with a wheel gear 23, the teeth 23a which mesh with the gear 41 of the fastening tool 40 so that the nut 21 can be screwed and unscrewed easily and form a side or lateral position. Accordingly, the nut 21 does not need to be fastened from the upper position. Therefore, in a steering wheel assembly W when the covering layers 7a and 7b of the spoke core members 6 and ring core member 5 are integrally formed with the pad portion 3, the steering wheel can still be easily and positively mounted on the steering shaft 30.

The nut 21 can be prevented from being removed by the provisional fixing mechanism 50 which is constituted by the support 20 and the fixing plate 25. On removal of the nut 21, both the nut 21 and the boss plate 10 are removed from the steering shaft 30 as an integral assembly. Accordingly, both mounting and removing of the boss plate 10 is facilitated.

The above mentioned structure differs from a mounting structure of the steering wheel having a separated pad 3 in that it includes the nut 21 having a modified shape.

SECOND EMBODIMENT

Figure 7:
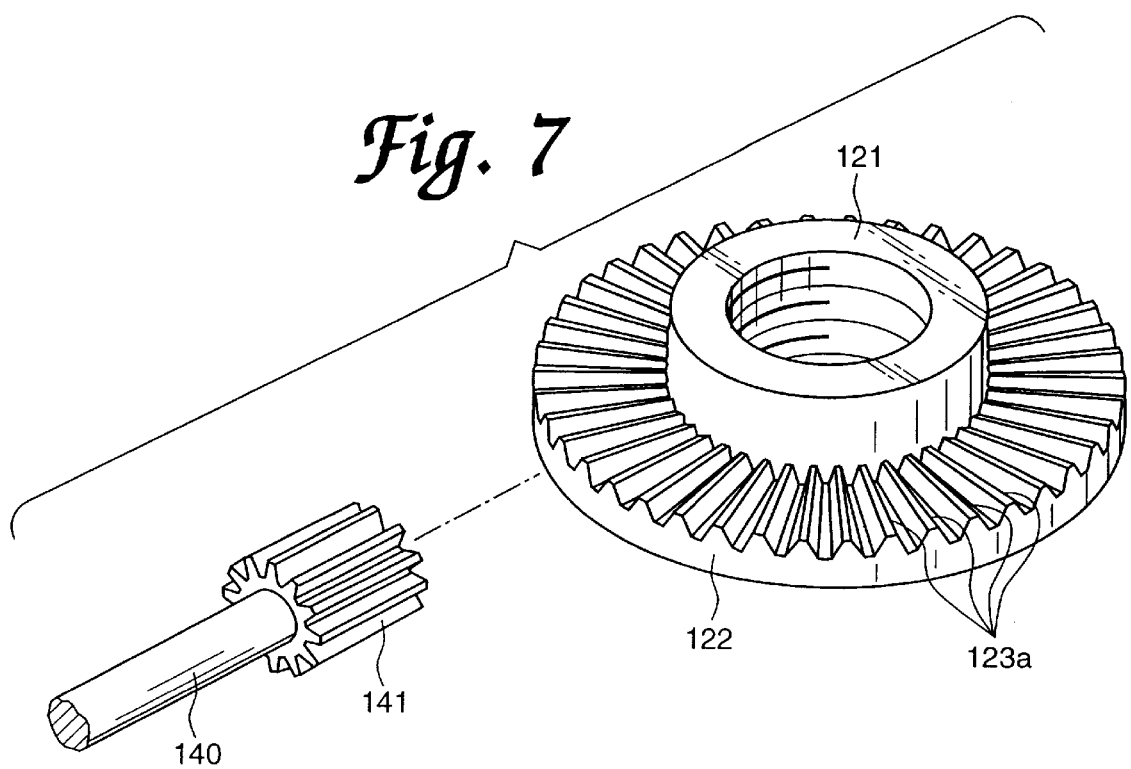
FIG. 7 is a perspective view showing the nut and the fastening tool according to a second embodiment.
Figure 8:
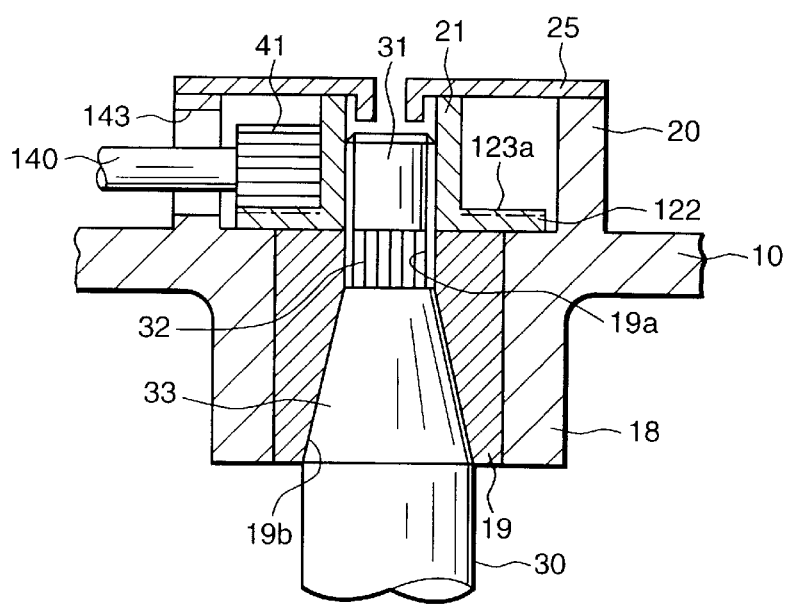
FIG. 8 is a sectional view showing the nut and fastening tool in the second embodiment.

A second embodiment will be described with reference to FIGS. 7 and 8. Also, only differences relative to the first embodiment will be described for clarity. In FIGS. 7 and 8 like reference numerals still denote like parts from the first embodiment.

Identical teeth 123a are formed at equal spaces on the upper surface of the disc 122 of the nut 121 as shown in FIG. 7. Teeth 141 which constitute a pinion gear, are mounted on or formed at the distal end of the fastening tool 140. In this case, by meshing the teeth 141 of fastening tool 141 with teeth 123a of nut 121, as shown in FIG. 8, and by rotating the tool 140 in a given direction, the nut 121 is screwed on or off the external thread 31 of the steering shaft 30. The support 20 on the boss plate 10 is still formed with an opening into which the fastening tool 40 is inserted.

In the above-mentioned second embodiment, advantages which are similar to that of the above-mentioned first embodiment can be achieved.

It is to be noted that the present invention is not limited to the above-mentioned first and second embodiments. It will be apparent to those skilled in the art that modifications and changes are possible within the spirit and scope of the appended claims.

Figure 9:
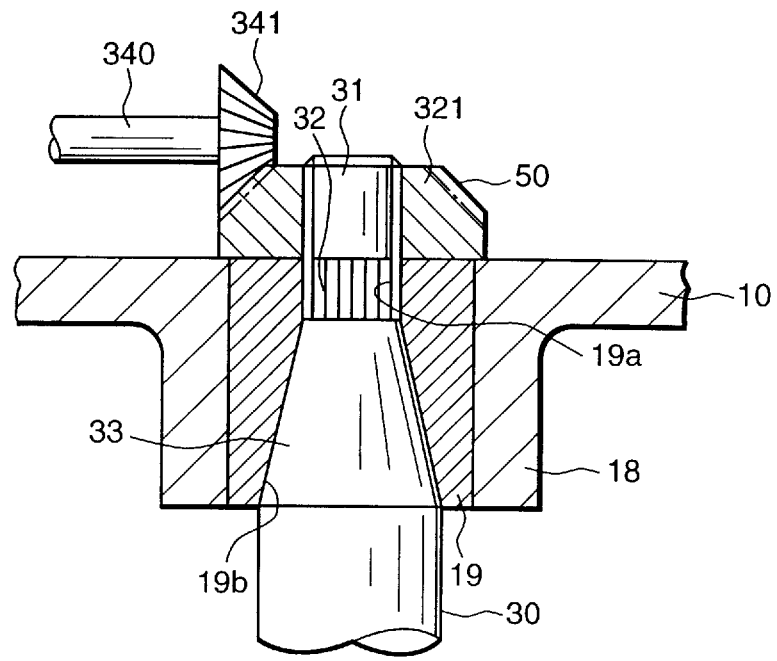
FIG. 9 is a cross-sectional view showing the nut and fastening tool of a third embodiment.
Figure 10:
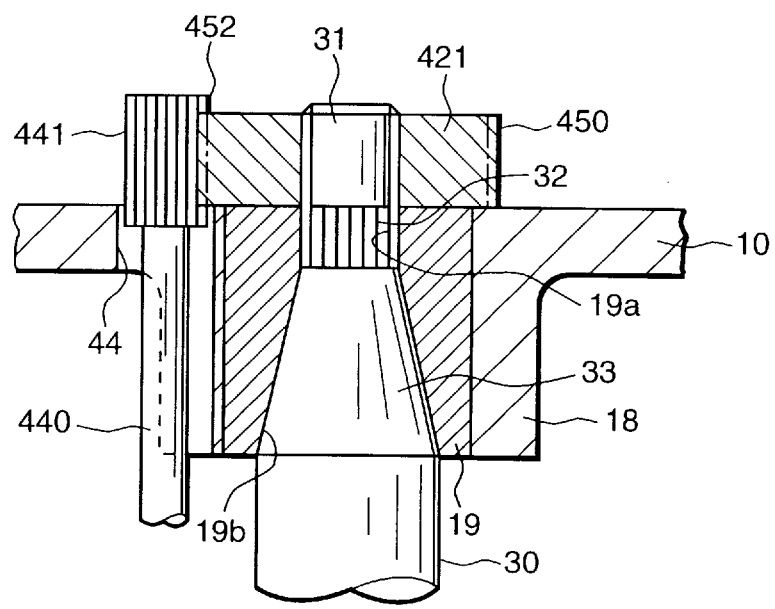
FIG. 10 is a cross-sectional view showing the nut and fastening tool of a fourth embodiment.

Indeed, the structure of the nut and the fastening tool can be modified as shown in FIGS. 9 and 10.

In FIGS. 9 and 10, the provisional fixing mechanism for preventing the removal of the nut is omitted. If the provisional fixing mechanism is employed, however, the above-mentioned advantages can, of course, be obtained. That is, in the third embodiment shown in FIG. 9, a bevel gear 341, which is provided on the distal end of the fastening tool 340, meshes with a bevel gear 50 on the outer periphery of the nut 321. Each of the gears 50 and 341, provided on the nut 321 and the fastening tool 340, respectively, comprise teeth having a corresponding pitch cone.

In the fourth embodiment shown in FIG. 10, a large gear 450 and a small gear 452, having different gear ratios, are provided on the nut 421 and the fastening tool 440, respectively. In this case, the boss plate 10 is provided with an opening 44 through which fastening tool 440 is inserted.

In brief, in the steering wheel assembly W in which the covering layer 7a and 7b of the ring core member 5 and the spoke core members 6 are formed integrally with the pad portion 3, the fastening nut 21 cannot be fastened from a position above the pad portion 3 as mentioned above. In order to eliminate this problem, the fastening nut is provided with gear teeth, which mesh with corresponding teeth of a fastening tool that is itself inserted to engage the nut from a position other than the position above the pad portion 3.

Although the wheel nut 21 comprises the disc 22 and the wheel gear 23 which are integrally formed, the disc 22 may be separated from the gear 23 so that it serves as a washer. In this case, the nut 21 can be easily fabricated.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A steering wheel assembly having an annular gripping ring portion, a pad portion in the center of said ring portion, a plurality of angularly spaced spokes which connect said ring portion with said pad portion and a boss plate secured to the lower side of said pad portion, said steering wheel being mounted on a steering shaft by screwing a threaded member on the steering shaft so that said boss plate can be rotated together with the steering shaft, a first gear operatively secured to said threaded member; and a fastening tool, said fastening tool having a second gear provided at a distal end of said fastening tool, said second gear meshing with said first gear for rotating said threaded member as said fastening tool is rotated.

2. A steering wheel assembly as defined in claim 1 in which said first and second gears are spur gears.

3. A steering wheel assembly as defined in claim 1 in which said first and second gear are bevel gears.

4. A steering wheel assembly as defined in claim 1 in which said boss plate is provided on its upper surface with a provisional fixing mechanism which fixes on upper surface of said threaded member.

5. A steering wheel assembly as defined in claim 4 wherein said provisional fixing mechanism engages at least a portion of said fastening tool.

6. A steering wheel assembly as defined in claim 1 wherein said second gear has gear teeth that extend in a direction parallel to gear teeth on said first gear.

7. A steering wheel assembly as defined in claim 1 wherein said second gear has gear teeth that lie at an angle with respect to an axis of said fastening tool.

8. A steering wheel assembly as defined in claim 1 wherein said second gear directly engages said first gear.

* * * * *